(12) United States Patent
Wenthen

(10) Patent No.: US 9,242,555 B2
(45) Date of Patent: Jan. 26, 2016

(54) TWO-SPEED TRANSMISSION FOR ELECTRIC VEHICLE

(71) Applicant: Magna Powertrain USA, Inc., Troy, MI (US)

(72) Inventor: David W. Wenthen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 14/010,672

(22) Filed: Aug. 27, 2013

(65) Prior Publication Data

US 2014/0031161 A1 Jan. 30, 2014

Related U.S. Application Data

(63) Continuation of application No. 12/742,327, filed as application No. PCT/US2008/083841 on Nov. 18, 2008, now Pat. No. 8,517,882.

(60) Provisional application No. 60/989,187, filed on Nov. 20, 2007.

(51) Int. Cl.
| | |
|---|---|
| *B60K 17/34* | (2006.01) |
| *B60K 17/342* | (2006.01) |
| *B60K 17/06* | (2006.01) |
| *B60K 17/12* | (2006.01) |
| *F16H 3/64* | (2006.01) |
| *B60K 1/00* | (2006.01) |
| *F16H 3/44* | (2006.01) |

(52) U.S. Cl.
CPC ................ *B60K 17/342* (2013.01); *B60K 1/00* (2013.01); *B60K 17/06* (2013.01); *B60K 17/12* (2013.01); *F16H 3/44* (2013.01); *F16H 3/64* (2013.01); *F16H 2200/0021* (2013.01); *F16H 2200/2007* (2013.01); *F16H 2200/2035* (2013.01); *F16H 2200/2097* (2013.01)

(58) Field of Classification Search
CPC ........... F16H 47/00; F16H 3/44; B60K 17/34; B60K 17/342
USPC .......... 475/207, 212, 213, 219, 221, 302, 343
See application file for complete search history.

(56) References Cited

U.S. PATENT DOCUMENTS

| | | | | |
|---|---|---|---|---|
| 5,117,709 | A * | 6/1992 | Dangel ........................ | 74/607 |
| 5,569,108 | A * | 10/1996 | Cadee .................... | B60K 6/105 475/1 |
| 5,937,711 | A * | 8/1999 | McCarrick ........... | B60K 17/342 74/333 |
| 6,093,125 | A * | 7/2000 | McCarrick ............ | F16H 37/022 475/210 |
| 6,244,368 | B1 * | 6/2001 | Ando ....................... | B60K 6/48 180/65.25 |
| 6,383,114 | B1 * | 5/2002 | Hoshiya et al. .................... | 477/2 |
| 7,086,987 | B2 * | 8/2006 | Janson et al. .................. | 475/284 |
| 7,125,357 | B2 * | 10/2006 | Porter ............................... | 475/5 |
| 2008/0039267 | A1 * | 2/2008 | Shim .............................. | 475/280 |

* cited by examiner

*Primary Examiner* — Derek D Knight
(74) *Attorney, Agent, or Firm* — Dickinson Wright PLLC

(57) ABSTRACT

A transmission to transfer power from an electric motor to first and second axles of a vehicle includes an input shaft adapted to be driven by the electric motor and a first planetary gear set. A second planetary gear set has a first member driven by the first planetary gear set, a second member restricted from rotation and a third member. A differential assembly has a first side gear adapted to drive the first axle, a second side gear adapted to drive the second axle and a pair of pinion gears meshed with the first and second side gears. A first clutch is operable to drivingly interconnect the first member and the differential assembly. A second clutch is operable to drivingly interconnect the third member and the differential assembly.

20 Claims, 3 Drawing Sheets

TWO-SPEED TRANSMISSION FOR ELECTRIC VEHICLE

CROSS-REFERENCE TO RELATED APPLICATIONS

This application is a continuation of U.S. Ser. No. 12/742,327 filed May 11, 2010 which is a U.S. National Stage of International Application No. PCT/US2008/083841 filed Nov. 18, 2008 which claims the benefit of and priority to U.S. Provisional Application No. 60/989,187 filed Nov. 20, 2007. The entire disclosure of each of the above noted applications is incorporated herein by reference.

BACKGROUND

The present disclosure generally relates to a power transmission device for a motor vehicle. More particularly, a two-speed transaxle for an electric vehicle is disclosed.

Conventional two-speed transaxles may include an input shaft having two helical driving gears. Input torque is provided to the input shaft that may be supported for rotation on tapered roller bearings. Speed selection is achieved by sliding a synchronizer sleeve between two positions on an intermediate shaft assembly. A drive pinion of a final drive gear set may be part of the intermediate shaft assembly. A final drive output gear is attached to a bevel and side gear differential assembly that distributes output torque to left and right wheels of a vehicle. While this type of double-reduction gearbox may have functioned satisfactorily in the past, this design causes relatively large masses to rotate at relatively large speeds. As such, costly balancing procedures may be required to assure quiet operation over the desired life of the product. Furthermore, the known two-speed transaxle requires the manufacture and use of the input shaft, the intermediate shaft and a differential carrier. Each of these components are rotatably supported by a housing. The costs associated with manufacturing and supporting these components may become undesirably burdensome. Furthermore, the previously known transaxle may weigh more than desired.

SUMMARY

A transmission to transfer power from an electric motor to first and second axle shafts of a vehicle includes an input shaft adapted to be driven by the electric motor and a first planetary gear set. A second planetary gear set has a first member driven by the first planetary gear set, a second member restricted from rotation and a third member. A differential assembly has a first side gear adapted to drive the first axle shaft, a second side gear adapted to drive the second axle shaft and a pair of pinion gears meshed with the first and second side gears. A first clutch is operable to drivingly interconnect the first member and the differential assembly. A second clutch is operable to drivingly interconnect the third member and the differential assembly.

In another form, a transmission to transfer power from an electric motor to first and second axle shafts of a vehicle includes an input shaft adapted to be driven by the electric motor. A first planetary gear set has a first sun gear driven by the input shaft, a first ring gear restricted from rotation and a plurality of first planet gears rotatably supported on a first carrier and meshed with the first sun gear and first ring gear. A second planetary gear set has a second sun gear driven by the first carrier of the first planetary gear set, a second carrier restricted from rotation, and second and third sets of planetary gears rotatably supported by the carrier. Each of the second planet gears are meshed with the second sun gear and one of the third planet gears. Each of the third planet gears is meshed with the second ring gear. A differential assembly has a first side gear adapted to drive the first axle shaft, a second side gear adapted to drive the second axle shaft, and a pair of pinion gears meshed with the first and second side gears. A first clutch is operable to drivingly interconnect the second sun gear and the differential assembly. A second clutch is operable to drivingly interconnect the second ring gear and the differential assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
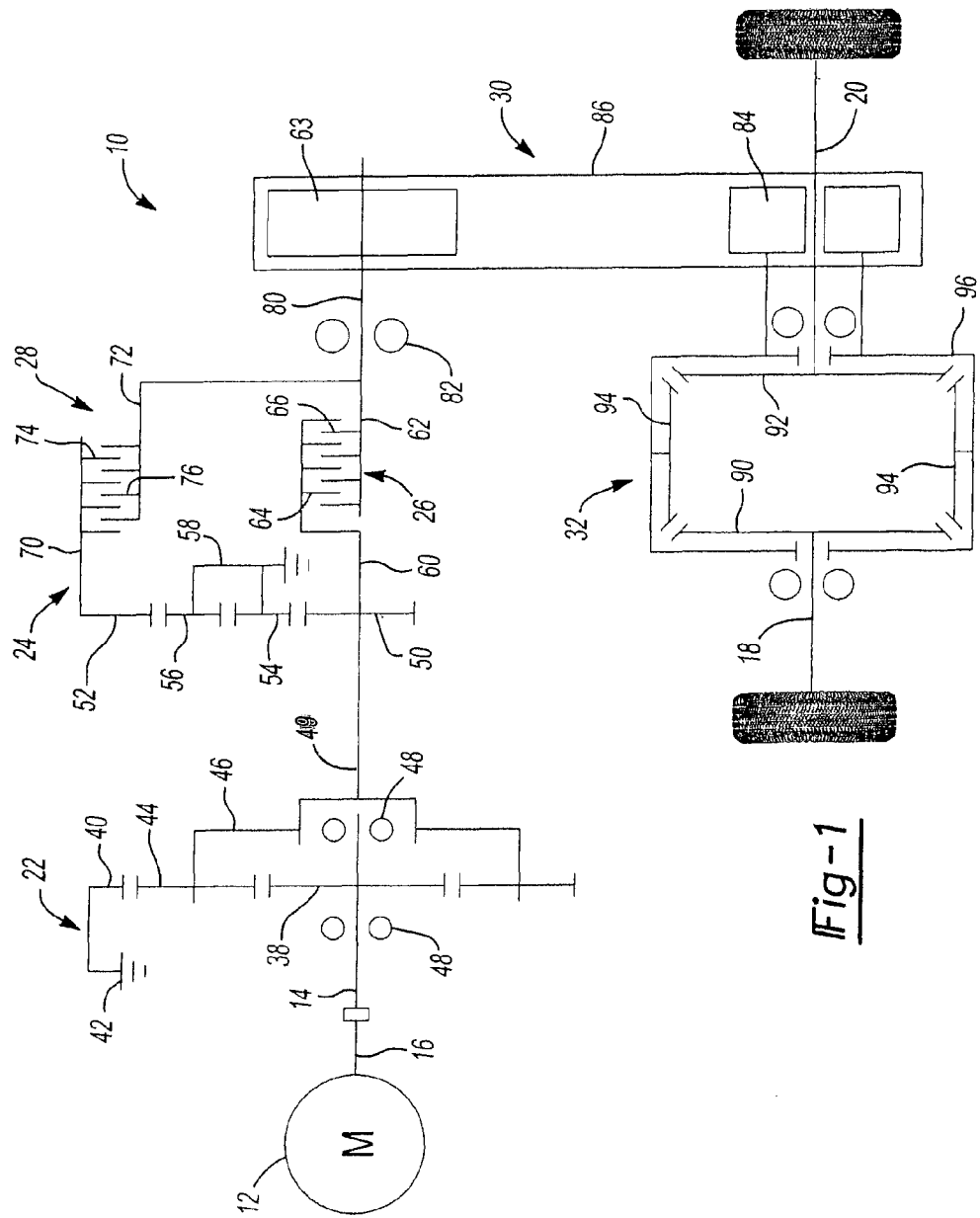
FIG. 1 is a stick diagram of a transaxle constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

Figure 2:
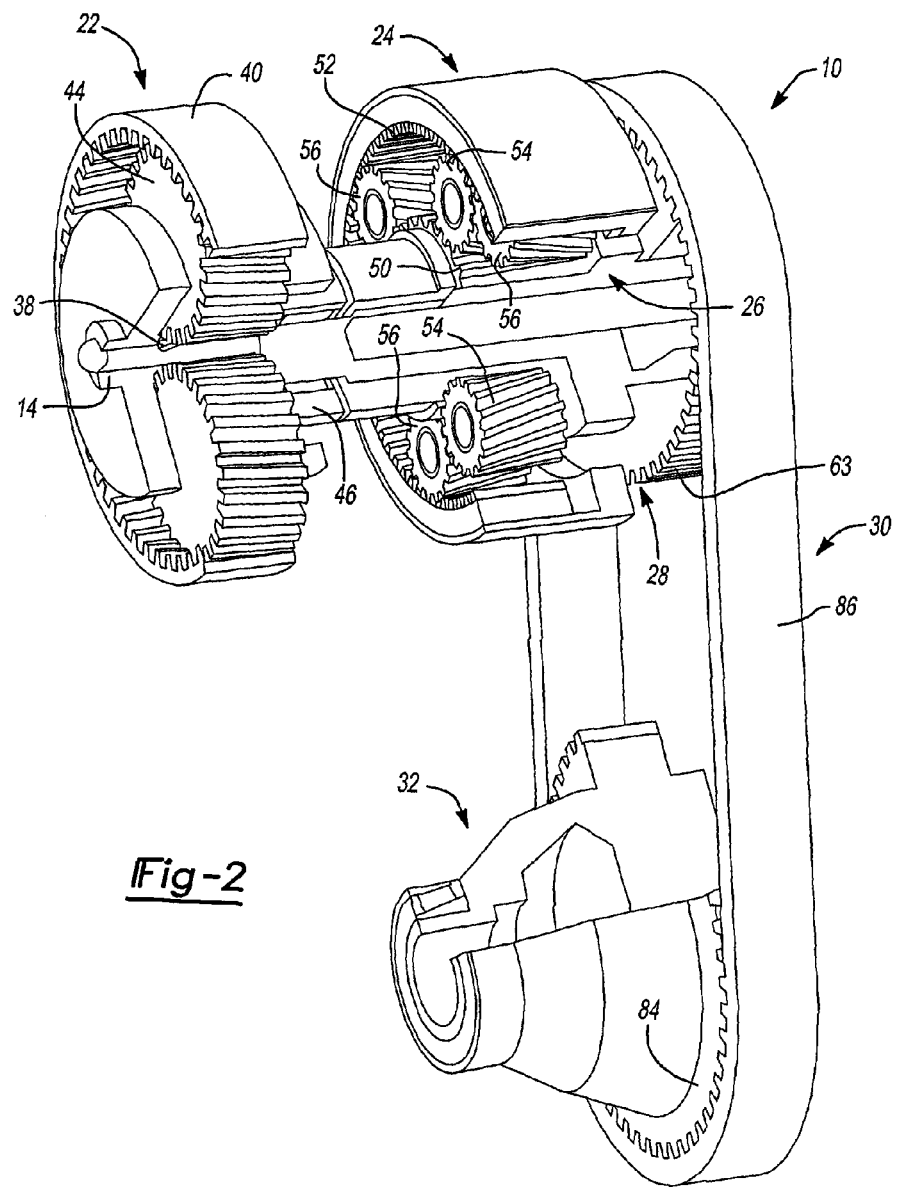
FIG. 2 is a fragmentary perspective view of the transaxle depicted in FIG. 1.

A two-speed transaxle 10 driven by an exemplary electric motor 12 is depicted in FIGS. 1 and 2. Transaxle 10 includes an input shaft 14 fixed for rotation with an output shaft 16 of electric motor 12. Transaxle 10 is operable to provide drive torque to a first axle shaft 18 and a second axle shaft 20. First and second axle shafts 18, 20 drive a pair of vehicle wheels (not shown). Power is transferred from electric motor 12 to the vehicle wheels through input shaft 14, a first planetary gear set 22, a second planetary gear set 24, one of a first clutch 26 and a second clutch 28, a sprocket and chain assembly 30 and a differential assembly 32.

Planetary gear set 22 is a simple planetary gear set including a sun gear 38 fixed for rotation with input shaft 14. A ring gear 40 is coupled to a housing 42 of transaxle 10 to restrict rotation of ring gear 40. A plurality of planet gears 44 are rotatably supported on a carrier 46. Each planet gear 44 is in meshed driving engagement with sun gear 38 and ring gear 40. Input shaft 14 and sun gear 38 are supported for rotation within housing 42 by bearings 48. Based on the arrangement previously described, planetary gear set 22 acts as a speed reducer with an input being provided to sun gear 38 and an output 49 provided by carrier 46. In the embodiment depicted in FIG. 1, it is contemplated that planetary gear set 22 provides a gear reduction ratio of approximately 5.70:1. It should be appreciated that other gear reduction ratios may be utilized without departing from the scope of the present disclosure.

Planetary gear set 24 is a complex planetary gear set driven by planetary gear set 22. In particular, planetary gear set 24 includes a sun gear 50 fixed for rotation with carrier 46 of planetary gear set 22. Planetary gear set 24 also includes a ring gear 52, a first set of planet gears 54, a second set of planet gears 56 and a carrier 58. Each of the first and second planet gears 54, 56 are supported for rotation on carrier 58.

Each of first planet gears 54 are positioned in meshed engagement with sun gear 50. Each of second planet gears 56 are positioned in meshed engagement with ring gear 52 and with one first planet gear 54. Carrier 58 is coupled to housing 42 and restricted from rotation. Planetary gear set 24 is configured as previously described to assure that ring gear 52 rotates in the same direction as sun gear 50.

First clutch 26 is selectively operable to drivingly interconnect sun gear 50 with sprocket and chain assembly 30. Similarly, second clutch 28 is selectively operable to drivingly interconnect ring gear 52 and sprocket and chain assembly 30. Transaxle 10 is configured as a two-speed power transmission mechanism. As such, transaxle 10 may be operated in a low range mode, a high range mode or a neutral mode. The high range mode of operation is obtained by actuating first clutch 26 and drivingly interconnecting sun gear 50 with sprocket and chain assembly 30. Second clutch 28 is inactive and does transfer torque at this time. In the high range mode, planetary gear set 24 does not provide a gear reduction but merely passes torque from planetary gear set 22 therethrough at a direct or 1:1 ratio.

To operate transaxle 10 in the low range mode, first clutch 26 is deactivated such that no torque is transferred therethrough while second clutch 28 is activated to transfer torque from ring gear 52 to sprocket and chain assembly 30. In the embodiment depicted in FIG. 1, it is contemplated that planetary gear set 24 provides a gear reduction ratio of approximately 1.93:1 when transaxle 10 is operated in the low range mode. The neutral mode is obtained by deactivating both first clutch 26 and second clutch 28.

First clutch 26 includes a drum 60 fixed for rotation with sun gear 50. A hub 62 is fixed for rotation with a drive sprocket 63 of sprocket and chain assembly 30. A first set of clutch plates 64 are splined for rotation with drum 60. A second set of clutch plates 66 are splined for rotation with hub 62. First clutch plates 64 are interleaved with second clutch plates 66 such that an external force applied to the clutch pack causes torque to transfer through first clutch 26.

Second clutch 28 includes a drum 70 fixed for rotation with ring gear 52. A hub 72 is fixed for rotation with drive sprocket 63. A first set of clutch plates 74 are splined for common rotation with drum 70. A second set of clutch plates 76 are fixed for rotation with hub 72. First clutch plates 74 are interleaved with second clutch plates 76. Upon receipt of an external compressive force, first clutch plates 74 engage second clutch plates 76 to cause a torque transfer through second clutch 28.

Drive sprocket 63, hub 62 and hub 72 are fixed for rotation with a drive shaft 80 that is rotatably supported within housing 42 by a bearing 82. A driven sprocket 84 is fixed for rotation with an input component of differential assembly 32. A chain 86 drivingly interconnects drive sprocket 63 and driven sprocket 84. In the example presented in FIG. 1, drive sprocket 63 includes 37 teeth while driven sprocket 84 includes 47 teeth to provide a reduction ratio of approximately 1.27:1.

The differential assembly 32 has a differential input a first differential output driving one of the wheels, and a second differential output driving the other one of the wheels. More specifically, in an embodiment, the first differential output is a first output gear adapted to drive a first axle shaft that drives the one of the wheels, and the second differential output is a second output gear adapted to drive a second axle shaft that drives the other one of the wheels. Differential assembly 32 includes a first side gear 90 fixed for rotation with first axle shaft 18. A second side gear 92 is fixed for rotation with second axle shaft 20. Pinion gears 94 are rotatably supported by the carrier 96. Carrier 96 is fixed for rotation with driven sprocket 84 and defines the input component of differential assembly 32. Each pinion gears 94 is in driving meshed engagement with first side gear 90 and second side gear 92. Second axle shaft 20 passes through driven sprocket 84 to facilitate rotation thereof relative to carrier 96. Based on the reduction ratios of the various components previously described, transaxle 10 provides a low range gear ratio of approximately 14.00:1 and a high range of approximately 7.24:1.

Figure 3:
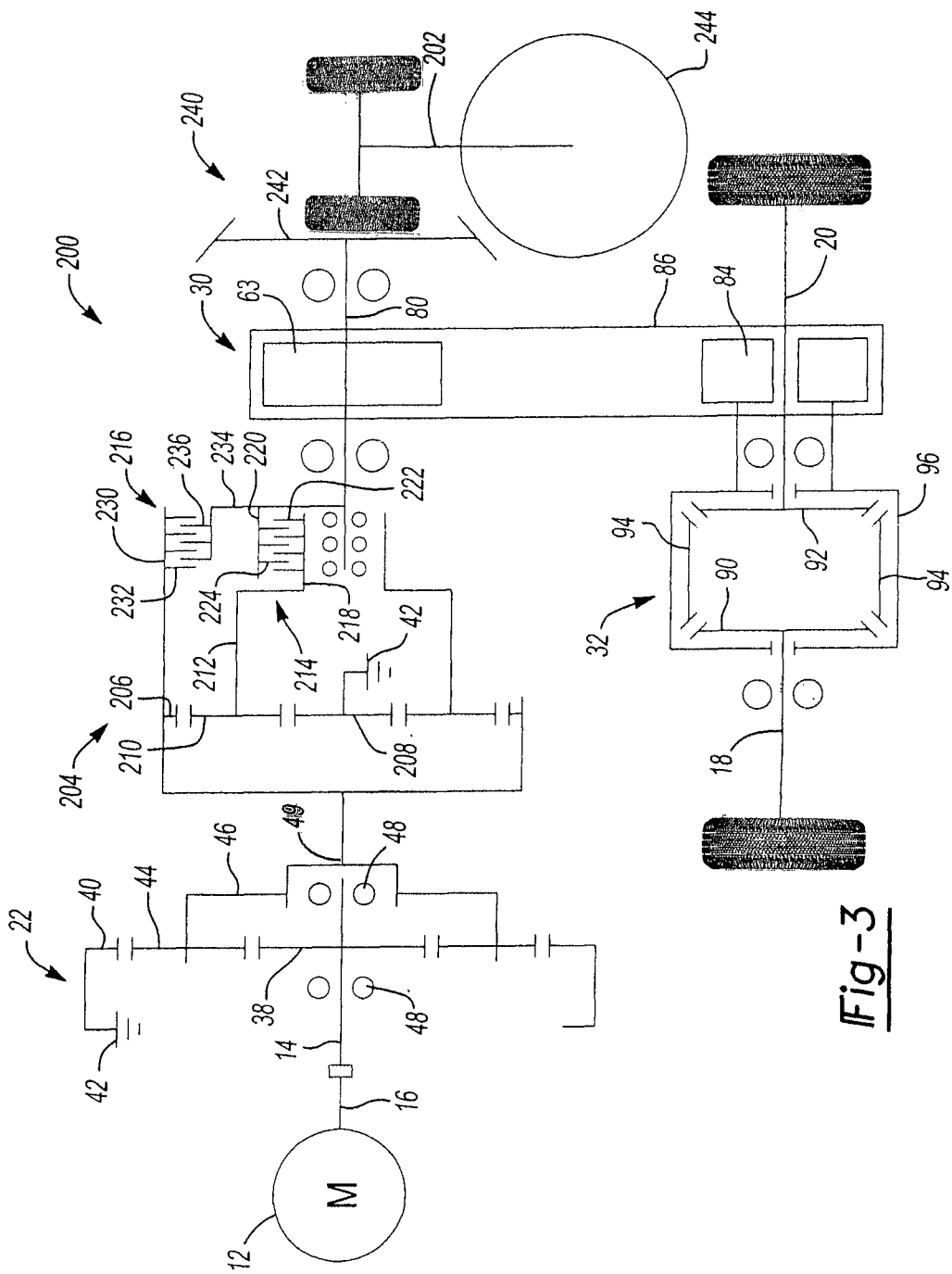
FIG. 3 is a stick diagram depicting another transmission.

Another transaxle 200 is depicted in FIG. 3. Transaxle 200 is substantially similar to transaxle 10. Accordingly, like elements will retain their previously introduced reference numerals. Transaxle 200 is arranged to provide drive torque to first axle shaft 18 and second axle shaft 20 for driving a pair of primary vehicle wheels of a primary driveline as well as to transmit drive torque to a secondary driveline via a propeller shaft 202 driving a pair of secondary vehicle wheels and provide a full-time four-wheel drive arrangement. Planetary gear set 22, sprocket and chain assembly 30 and differential assembly 32 are substantially the same as previously described.

A planetary gear set 204 receives torque from carrier 46 of planetary gear set 22. Planetary gear set 204 includes a ring gear 206 fixed for rotation with carrier 46 of planetary gear set 22. A sun gear 208 is coupled to housing 42 and restricted from rotation. A plurality of planet gears 210 are supported for rotation on a carrier 212. Each planet gear 210 is in driving meshed engagement with ring gear 206 and sun gear 208. A first clutch 214 selectively drivingly interconnects carrier 212 and drive sprocket 63. A second clutch 216 selectively drivingly interconnects ring gear 206 with drive sprocket 63. It should be appreciated that planetary gear set 204 may be arranged as a simple planetary gear set because ring gear 206 rotates in the same direction as carrier 212 when sun gear 208 is restricted from rotation.

First clutch 214 includes a hub 218 fixed for rotation with carrier 212. A drum 220 is fixed to drive shaft 80 for rotation with drive sprocket 63. A first set of clutch plates 222 are in splined engagement with hub 218. A second set of clutch plates 224 are in splined engagement with hub 220. Torque is transferred across first clutch 214 when a compressive force is applied to first clutch plates 222 and second clutch plates 224.

Second clutch 216 includes a drum 230 fixed for rotation with ring gear 206. A first set of clutch plates 232 are splined to drum 230. A hub 234 is fixed to drive shaft 80 for rotation with drive sprocket 63. A second set of clutch plates 236 are splined to hub 234. Torque may be transferred across second clutch 216 by applying a compressive force to first clutch plates 232 and second clutch plates 236.

A speed increasing gear set 240 includes a pinion gear 242 fixed for rotation with drive shaft 80 and a ring gear 244 in meshed engagement with pinion gear 242. Speed increasing gear set 240 provides drive torque to the secondary driveline via propeller shaft 202. Gearset 240 is configured as an overdrive or speed increasing gear set to allow propeller shaft 202 to include a reduced diameter to transfer torque to the set of secondary driven wheels. The reduced diameter reduces the mass and the associated challenges related to balancing a larger diameter propeller shaft. It should be appreciated that speed increasing gear set 240 may also be coupled to drive shaft 80 of transaxle 10 to provide four-wheel drive capability.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transmission for transferring rotary power from an electric motor to a pair of primary wheels rotatable about a first rotary axis and a pair of secondary wheels rotatable about a second rotary axis in a motor vehicle, the transmission comprising:
   an input shaft adapted to be driven by the electric motor about a third rotary axis generally parallel to and offset from the first rotary axis and the second rotary axis;
   a first planetary gear set having an input driven by said input shaft and an output driven at a reduced speed relative to said input;
   a second planetary gear set having a first member driven by said output of said first planetary gear set, a second member restricted from rotation, and a third member;
   a differential assembly aligned for rotation about the first rotary axis, said differential assembly having a differential input, a first differential output driving one of the primary wheels, and a second differential output driving the other one of the primary wheels;
   a drive shaft driven by said second planetary gear set and aligned for rotation about said third rotary axis;
   a transfer assembly drivingly connecting said differential input for rotation with said drive shaft;
   a first clutch operable for selectively coupling said first member and said drive shaft;
   a second clutch operable for selectively coupling said third member and said drive shaft; and
   a driveline coupling said drive shaft to the pair of secondary wheels, said driveline including a propeller shaft aligned for rotation about a fourth rotary axis transverse to the first rotary axis and the second rotary axis and said third rotary axis.

2. The transmission of claim 1 wherein said first member of said second planetary gear set is a ring gear, said second member is a non-rotary sun gear, and said third member is a carrier, wherein said second planetary gear set further includes planet gears rotatably supported by said carrier and which are meshed with said ring gear and said sun gear.

3. The transmission of claim 1 wherein said transfer assembly includes a first transfer member fixed for rotation with said drive shaft, a second transfer member fixed for rotation with said differential input, and a drive member operable for drivingly interconnecting said second transfer member to said first transfer member, wherein said first clutch is operable for selectively coupling said ring gear to said first transfer member and define a first speed ratio drive connection between said output of said first planetary gear set and said differential input, and wherein said second clutch is operable for selectively coupling said carrier to said first transfer member and define a second speed ratio drive connection between said output of said first planetary gear set and said differential input.

4. The transmission of claim 3 wherein said transfer assembly provides a speed reduction between said first transfer member and said second transfer member.

5. The transmission of claim 3 wherein said first transfer member of said transfer assembly is a drive sprocket and said transfer member is a driven sprocket and said drive member is a chain assembly for drivingly interconnecting said drive sprocket and said driven sprocket.

6. The transmission of claim 1 wherein said first member of said second planetary gear set is a ring gear, said second member is a non-rotary sun gear, and said third member is a planet carrier rotatably supporting planet gears which are meshed with said ring gear and said non-rotary sun gear, wherein said first clutch is operable for selectively coupling said ring gear to said drive shaft for establishing a first speed ratio drive connection between said output of said first planetary gear set and said differential input, and wherein said second clutch is operable for selectively coupling said planet carrier to said drive shaft for establishing a second speed ratio drive connection between said output of said first planetary gear set and said differential input.

7. The transmission of claim 6 wherein said driveline includes a third gear set drivingly interconnecting said drive shaft to said propeller shaft for driving the pair of secondary wheels, said third gear set including a pinion gear fixed for rotation about said third rotary axis with said drive shaft and a ring gear aligned for rotation about said fourth rotary axis in meshed engagement with said pinion gear and attached to said propeller shaft for driving the pair of secondary wheels.

8. A transmission for transferring rotary power from an electric motor to a pair of primary wheels rotatable about a first rotary axis and a pair of secondary wheels rotatable about a second rotary axis in a motor vehicle, the transmission comprising:
   an input shaft adapted to be driven by the electric motor about a third rotary axis generally parallel to and offset from the first rotary axis and the second rotary axis;
   a first planetary gear set including a first sun gear driven by said input shaft, a non-rotary first ring gear, a first carrier, and a plurality of first planet gears rotatably supported by said first carrier and which are meshed with said first sun gear and said non-rotary first ring gear;
   a second planetary gear set including a second ring gear driven by said first carrier, a non-rotary second sun gear, a second carrier, and a plurality of second planet gears rotatably supported by said second carrier and which are meshed with said second ring gear and said non-rotary second sun gear;
   a differential assembly aligned for rotation about the first rotary axis, said differential assembly having a differential input, a first differential output driving one of the primary wheels, and a second differential output driving the other one of the primary wheels;
   a drive shaft driven by at least one of said second carrier and said second ring gear of said second planetary gear set and aligned for rotation about said third rotary axis;
   a first clutch operable for selectively coupling said drive shaft for rotation with said second ring gear;
   a second clutch operable for selectively coupling said drive shaft for rotation with said second carrier; and
   a driveline coupling said drive shaft to the pair of secondary wheels, said driveline including a propeller shaft aligned for rotation about a fourth rotary axis transverse to the first rotary axis and the second rotary axis and said third rotary axis.

9. The transmission of claim 8 further comprising a transfer assembly interconnecting said drive shaft to said differential input, wherein said first clutch is operable for selectively coupling said second ring gear to said drive shaft to establish a first speed ratio drive connection between said input shaft and said differential assembly, and wherein said second clutch is operable for selectively coupling said second carrier to said drive shaft to establish a second speed ratio drive connection between said input shaft and said differential assembly.

10. The transmission of claim 9 wherein said transfer assembly includes a first sprocket driven by said drive shaft, a second sprocket driving said differential input, and a drive member drivingly interconnecting said first and second sprockets.

11. The transmission of claim 9 wherein said driveline includes a third gear set drivingly interconnecting said drive shaft to said propeller shaft for driving the pair of secondary wheels, wherein said first clutch is operable for selectively coupling said second ring gear to said drive shaft to establish a first speed ratio drive connection between said input shaft and said propeller shaft, and wherein said second clutch is operable for selectively coupling said second carrier to said drive shaft to establish a second speed ratio drive connection between said input shaft and said propeller shaft.

12. The transmission of claim 8 wherein said first and second clutches are multi-plate friction clutches.

13. A transmission for transferring rotary power from an electric motor to a pair of primary wheels rotatable about a first rotary axis and a pair of secondary wheels rotatable about a second rotary axis in a motor vehicle, the transmission comprising:
an input shaft adapted to be driven by the electric motor about a third rotary axis generally parallel to and offset from the first rotary axis and the second rotary axis;
an output aligned for rotation about said third rotary axis;
a first gear set having an input member driven by said input shaft and an output member driving said output at a reduced speed ratio relative to said input shaft;
a second gear set having a second ring gear driven by said output, a non-rotary second sun gear, a second carrier, and a plurality of second planet gears rotatably supported by said second carrier and which are meshed with said second ring gear and said non-rotary second sun gear;
a drive shaft driven by said second gear set and aligned for rotation about said third rotary axis;
a differential assembly aligned for rotation about the first rotary axis, said differential assembly having a differential input, a first differential output driving one of the primary wheels, and a second differential output driving the other one of the primary wheels;
a transfer assembly interconnecting said differential input for rotation with said drive shaft;
a first clutch operable for selectively coupling said second ring gear to said drive shaft;
a second clutch operable for selectively coupling said second carrier to said drive shaft; and
a driveline coupling said drive shaft to the pair of secondary wheels, said driveline including a propeller shaft aligned for rotation about a fourth rotary axis transverse to the first rotary axis and the second rotary axis and said third rotary axis.

14. The transmission of claim 13 wherein said first gear set is a simple planetary gear set having a fixed first ring gear, a first sun gear being said input member driven by said input shaft, a first planet carrier being said output member driving said output, and first planet gears rotatably supported by said first planet carrier and meshed with said first ring gear and said first sun gear of said first gear set.

15. The transmission of claim 13 wherein said first clutch is a first friction clutch having a first drum driven by said ring gear, a first hub driving said drive shaft, and a first multi-plate clutch pack operably disposed between said first drum and said first hub.

16. The transmission of claim 15 wherein said second clutch is a second friction clutch having a second drum driving said drive shaft, a second hub driven by said carrier, and a second multi-plate clutch pack operably disposed between said second drum and said second hub.

17. The transmission of claim 16 wherein said second drum of said second clutch is integrally formed with and extends axially and annularly about said second ring gear of said second gear set.

18. The transmission of claim 13 wherein said differential input is a differential carrier, wherein said first differential output is a first output gear adapted to drive a first axle shaft that drives the one of the wheels, and wherein said second differential output is a second output gear adapted to drive a second axle shaft that drives the other one of the wheels.

19. The transmission of claim 13 wherein said driveline includes a third gear set drivingly connecting said drive shaft to said propeller shaft for driving the pair of secondary wheels, said third gear set including a pinion gear fixed for rotation about said third rotary axis with said drive shaft and a ring gear aligned for rotation about said fourth rotary axis in meshed engagement with said pinion gear and attached to said propeller shaft for driving the pair of secondary wheels.

20. A transmission for transferring rotary power from an electric motor to a pair of primary wheels rotatable about a first rotary axis and a pair of secondary wheels rotatable about a second rotary axis in a motor vehicle, the transmission comprising:
an input shaft adapted to be driven by the electric motor about a third rotary axis generally parallel to and offset from the first rotary axis and the second rotary axis;
a first planetary gear set having a first sun gear driven by said input shaft, a non-rotary first ring gear, a carrier, and a plurality of first planet gears rotatably supported on said carrier and meshed with said first ring gear and said first sun gear;
a second planetary gear set having a second ring gear coupled for rotation with said first carrier, a non-rotary second sun gear, a second carrier, and a plurality of second planet gears rotatably supported from said second carrier and meshed with said non-rotary second sun gear and said second ring gear;
a differential assembly aligned for rotation about the first rotary axis, said differential assembly having a differential input, a first differential output driving one of the primary wheels, and a second differential output driving the other one of the primary wheels;
a transfer assembly driving said differential assembly;
a first clutch for selectively coupling said second ring gear to said transfer assembly;
a second clutch for selectively coupling said second carrier to said transfer assembly;
a drive shaft driven by said second planetary gear set and aligned for rotation about said third rotary axis; and
a driveline coupling said drive shaft to the pair of secondary wheels, said driveline including a propeller shaft aligned for rotation about a fourth rotary axis transverse to the first rotary axis and the second rotary axis and said third rotary axis.

* * * * *